A. K. PRUDEN.
VENTILATOR AND VENTILATING SYSTEM.
APPLICATION FILED MAY 16, 1918.
1,327,879.
Patented Jan. 13, 1920.
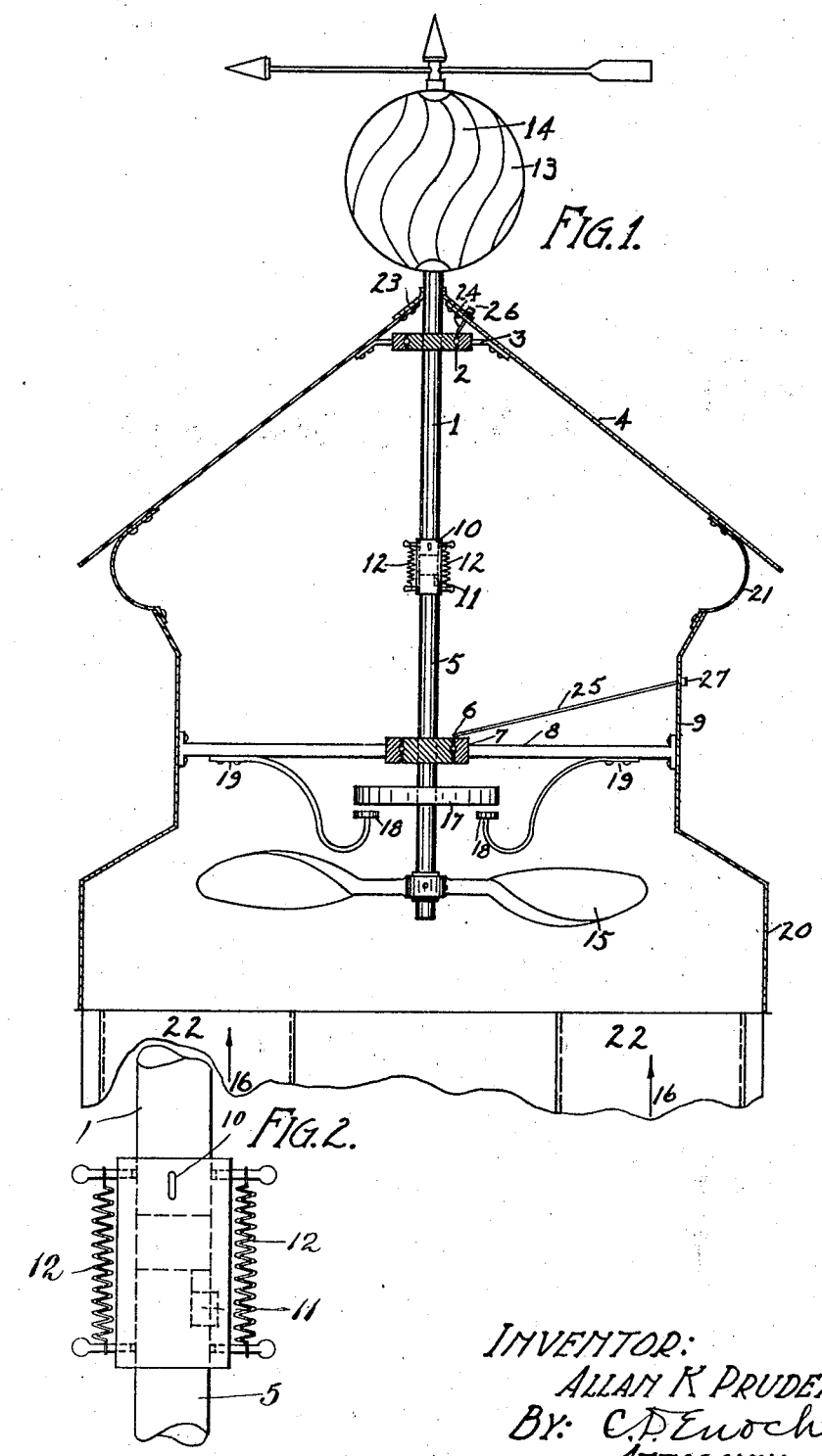
INVENTOR:
ALLAN K PRUDEN.
BY: C.P.Enochs
ATTORNEY:

UNITED STATES PATENT OFFICE.

ALLAN K. PRUDEN, OF ST. PAUL, MINNESOTA.

VENTILATOR AND VENTILATING SYSTEM.

1,327,879. Specification of Letters Patent. Patented Jan. 13, 1920.

Application filed May 16, 1918. Serial No. 235,216.

*To all whom it may concern:*

Be it known that I, ALLAN K. PRUDEN, a citizen of the United States, residing at St. Paul, county of Ramsey, State of Minnesota, have invented new and useful Improvements in Ventilators and Ventilating Systems, of which the following is a specification.

One object of my invention is to provide in a ventilating system positive means operated by wind pressure for creating and maintaining a draft in the ventilating system.

Another object of my invention is to provide in a ventilator operated by wind pressure, governing means for limiting the speed to which the mechanism may be operated.

Another object of my invention is to provide in a ventilator a governor operated by wind pressure created by the speed of rotation of one of the governing parts, rather than depending upon centrifugal force.

Another object of my invention is to provide in a wind operated fan a driving element to take advantage of wind currents from any direction.

With these and incidental objects in view the invention consists of certain novel features of construction and combination of parts, the essential elements of which are hereinafter described with reference to the drawing which accompanies and forms a part of this specification.

In the drawing, Figure 1, is a sectional side elevation of a ventilator embodying my invention, Fig. 2 is an enlarged detail of the shaft coupling.

Looking at Fig. 1 the shaft 1 is mounted in an anti-friction bearing 2, the stationary element of which is carried at 3 by the cap 4.

The shaft 5 is carried by the anti-friction bearing 6, a stationary element 7 of which is carried by a spider 8 mounted in the throat 9 of the ventilator.

Keyed to the shaft 1 is a sleeve 10 which is feather keyed at 11 to the shaft 5 to allow longitudinal play of the shaft in the sleeve, suitable springs 12 hold the shaft 5 normally in a retracted position.

A sphere shaped vane 13 has a series of spiraling fins 14 therearound so as to be rotated by wind blowing in any direction whether horizontal or upwardly.

The shaft 5 carries a fan 15 and it is evident that this fan 15 will be rotated by the rotation of the spherical vane 13.

The fan 15 is so disposed as to create a draft upwardly as indicated by the arrows 16 and it is evident that this will create a downward thrust on the shaft 5 which normally will be overcome by the tension of the springs 12.

When, however, the speed of rotation exceeds a predetermined amount, this downward thrust will overcome the spring tension and the friction disk 17 will impinge on the drags 18 spring mounted at 19 to the spider 8, thereby serving to limit the speed of rotation of the fan 15.

The hood 20 is of ordinary construction and supporting bars 21 support the cap 4 in a manner well known to those skilled in the art, and hence this construction will not be further described. Pipes 22 of any suitable number, size and shape connect the hood 20 to the ventilating system of the building.

A skirt 23 is provided, extending downwardly and adjacent to the surface of the cap 4 for the purpose of preventing rain or snow from getting into the bearing 2, and suitable oil pipes 24 and 25 with caps 26 and 27 respectively are provided for oiling the antifriction bearing.

While I am aware that wind power has been used for various purposes, I believe myself to be the first to apply wind power to the use herein described, and also to be the first to apply to such a wind engine or motor a governing means whereby the speed of rotation may be held within predetermined limits.

With the system and ventilator as described, I provide a forced draft ventilation under conditions of wind movement, while under conditions of still air I have the full advantage of what is ordinarily termed thermal air circulation as the air may pass freely through the throat and out between the throat and cap between the bars 21.

While I have described my invention and illustrated it in one particular design, I do not wish it understood that I limit myself to this construction, as it is evident that the application of my invention may be varied in many ways within the scope of the following claims.

Claims:

1. In a ventilator, the combination of a wind motor exposed to the action of the wind and having a rotating shaft, a blower fan having a shaft, the centers of such shafts being in line, a slidable connection between said two shafts to allow longitudinal motion of said blower fan, clutch means carried by said motor shaft for rotating said fan shaft, resilient means for holding said shafts in close juxtaposition, a friction disk carried by said fan shaft, and a drag mounted below said friction disk so said friction disk may impinge on said drag when said friction disk is lowered.

2. In a ventilator, the combination of a hood, a cap supported by said hood, but spaced therefrom, a wind motor, a shaft driven by said wind motor, a blower fan, a shaft for said blower fan, said shafts being mounted for the same axis of rotation, a slidable joint connecting said shafts, means carried by said wind motor shaft for driving said fan shaft, resilient means connecting said two shafts, said blower fan shaft being so mounted that when rotating a downward pressure will be exerted thereby against said resilient connecting means, a friction disk carried by said fan shaft, a drag associated with said friction disk, said friction disk impinging on said drag when the thrust of wind fan overbalances said resilient means a pre-determined amount.

ALLAN K. PRUDEN.